United States Patent
Cheng et al.

(10) Patent No.: US 11,516,293 B2
(45) Date of Patent: Nov. 29, 2022

(54) NETWORK DEVICE, CONTROL SYSTEM AND METHOD THEREOF

(71) Applicants: Jay Cheng, Sunnyvale, CA (US); Po-ting Huang, New Taipei (TW)

(72) Inventors: Jay Cheng, Sunnyvale, CA (US); Po-ting Huang, New Taipei (TW)

(73) Assignee: WeMo Corp., Taipei (TW)

( * ) Notice: Subject to any disclaimer, the term of this patent is extended or adjusted under 35 U.S.C. 154(b) by 178 days.

(21) Appl. No.: 16/643,386

(22) PCT Filed: Aug. 30, 2018

(86) PCT No.: PCT/CN2018/103275
§ 371 (c)(1),
(2) Date: Feb. 28, 2020

(87) PCT Pub. No.: WO2019/042366
PCT Pub. Date: Mar. 7, 2019

(65) Prior Publication Data
US 2020/0195722 A1    Jun. 18, 2020

Related U.S. Application Data

(60) Provisional application No. 62/552,140, filed on Aug. 30, 2017.

(51) Int. Cl.
*H04L 29/00* (2006.01)
*H04L 67/12* (2022.01)
(Continued)

(52) U.S. Cl.
CPC .......... *H04L 67/12* (2013.01); *H04L 63/0428* (2013.01); *H04L 63/083* (2013.01); *H04L 63/20* (2013.01); *H04Q 9/00* (2013.01)

(58) Field of Classification Search
CPC ..... H04L 67/12; H04L 63/20; H04L 63/0428; H04L 63/083; H04Q 9/00
See application file for complete search history.

(56) References Cited

U.S. PATENT DOCUMENTS 8,841,987 B1 * 9/2014 Stanfield ............... B60R 25/241
340/5.61
9,963,106 B1 * 5/2018 Ricci ................. G08G 1/096725
(Continued)

FOREIGN PATENT DOCUMENTS

CN    104954424 A    9/2015
CN    106254468 A    12/2016
(Continued)

OTHER PUBLICATIONS

Communication Technologies for Vehicles: Third International Workshop, Nets4Cars/Nets4Trains 2011, Oberphfaffenhofen, Germany, Mar. 2011. Proceedings, 2011. 250 pages. (Year: 2011).*

*Primary Examiner* — Don G Zhao
(74) *Attorney, Agent, or Firm* — Kramer & Amado, P.C.

(57) ABSTRACT

The present invention relates to a control system for a network device. The control system comprises a network device for connecting to a network and transmitting status information of the network device; a host server for receiving the status information via the network and transmitting action information related to the network device, wherein the action information includes at least an action command; and a Message Queuing Telemetry Transport (MQTT) server for receiving the action information from the host server, and transmitting the action information to the network device, wherein the network device executes the action command according to the received action information.

16 Claims, 9 Drawing Sheets

(51) Int. Cl.
 *H04L 9/40* (2022.01)
 *H04Q 9/00* (2006.01)

(56) References Cited

U.S. PATENT DOCUMENTS

| | | | | |
|---|---|---|---|---|
| 10,377,345 B1* | 8/2019 | Oesterling | ............. | G06Q 50/30 |
| 11,225,404 B2* | 1/2022 | Harshbarger | ....... | B66F 9/07581 |
| 2005/0128068 A1* | 6/2005 | Winick | ................ | G08B 25/008 |
| | | | | 340/517 |
| 2011/0060480 A1* | 3/2011 | Mottla | ............... | G01C 21/3608 |
| | | | | 701/2 |
| 2013/0246135 A1* | 9/2013 | Wang | ...................... | G06F 17/00 |
| | | | | 701/2 |
| 2014/0282470 A1* | 9/2014 | Buga | ......................... | G06F 8/65 |
| | | | | 717/170 |
| 2015/0281374 A1 | 10/2015 | Petersen et al. | | |
| 2016/0055695 A1* | 2/2016 | Saeedi | .................. | G07C 9/257 |
| | | | | 340/5.52 |
| 2016/0093216 A1* | 3/2016 | Lee | .......................... | G07C 5/02 |
| | | | | 340/870.11 |
| 2016/0307380 A1* | 10/2016 | Ho | ...................... | H04L 65/1069 |
| 2016/0323257 A1* | 11/2016 | Kang | ...................... | H04L 63/08 |
| 2017/0021768 A1 | 1/2017 | Jaegal et al. | | |
| 2017/0327082 A1* | 11/2017 | Kamhi | ....... | B60R 25/102 |
| 2018/0108192 A1* | 4/2018 | Ho | ........................ | H04L 67/125 |
| 2018/0257604 A1* | 9/2018 | Komeya | ............... | H04L 63/102 |
| 2018/0261027 A1* | 9/2018 | Fujiwara | ............... | H04L 9/0816 |
| 2018/0261028 A1* | 9/2018 | Fujiwara | ............... | H04W 12/06 |
| 2019/0135229 A1* | 5/2019 | Ledvina | ............... | H04W 4/023 |
| 2019/0342096 A1* | 11/2019 | Starosielsky | .......... | H04L 63/083 |
| 2019/0366851 A1* | 12/2019 | Moy | ...................... | B60L 53/65 |
| 2020/0010051 A1* | 1/2020 | Durnov | ................ | G06V 40/172 |
| 2020/0021679 A1* | 1/2020 | Yun | ....................... | H04W 4/029 |
| 2020/0349786 A1* | 11/2020 | Ho | ..................... | G06K 9/00288 |
| 2021/0078441 A1* | 3/2021 | Okubo | ............... | G06Q 30/0284 |

FOREIGN PATENT DOCUMENTS

| | | | |
|---|---|---|---|
| CN | 106364430 A | | 2/2017 |
| CN | 106934945 A | * | 7/2017 |
| CN | 107077133 A | | 8/2017 |
| CN | 109242464 A | * | 1/2019 |
| CN | 109697651 A | * | 4/2019 |
| WO | 2016/054010 A1 | | 4/2016 |

* cited by examiner

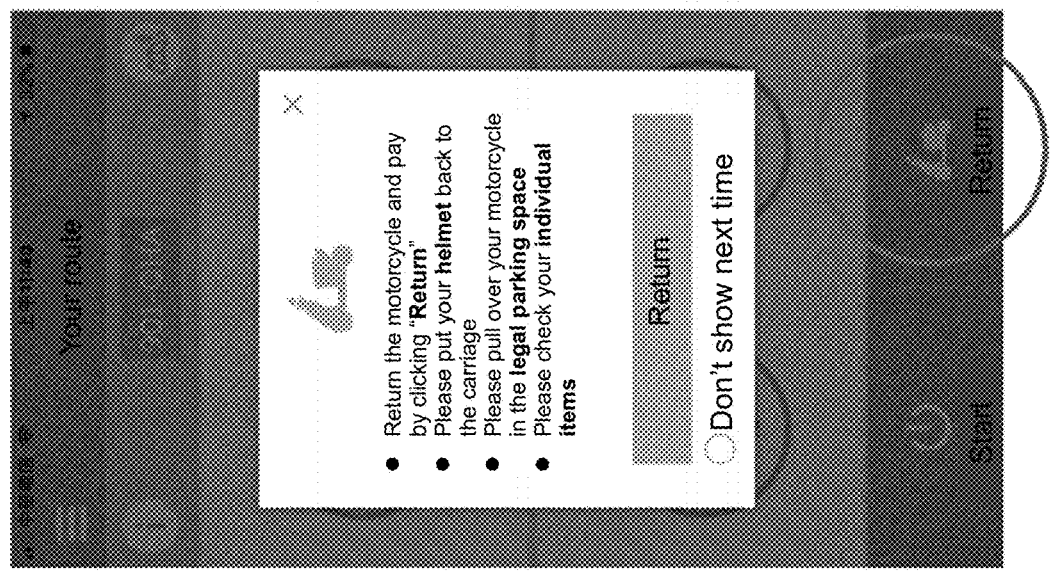
FIG.9H
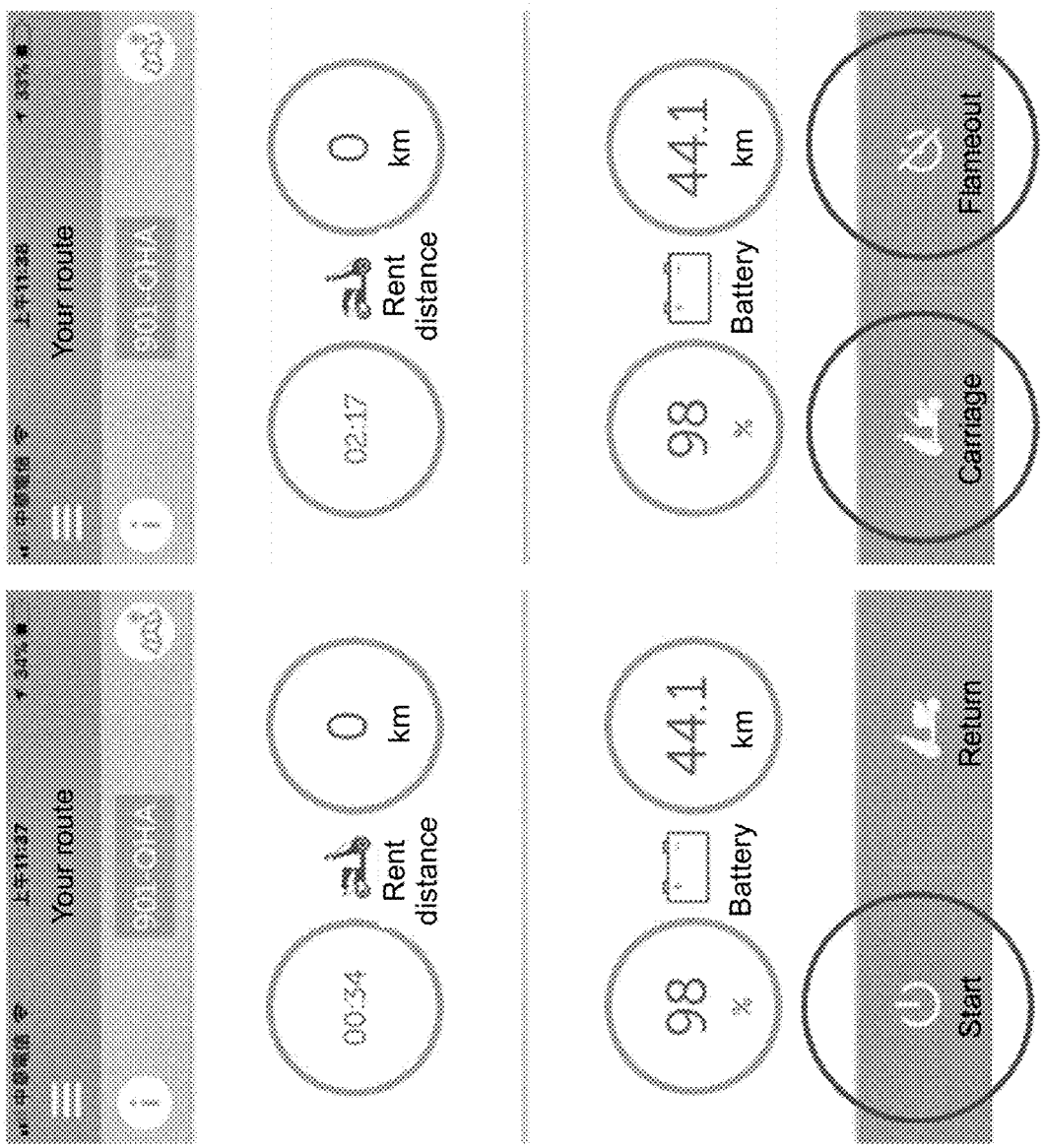
FIG.9G
FIG.9F

NETWORK DEVICE, CONTROL SYSTEM AND METHOD THEREOF

BACKGROUND OF THE INVENTION

Field of the Invention

The present invention relates to a control system, a control method, and a network device for a network device, and more particularly to a control system, a control method, and a network device for a network device in a shared motor vehicle.

Description of the Prior Art

With the development of the sharing economy, shared motor vehicles such as the electric scooters, the electric motorcycles, the electric cars, the traditional motorcycles, or the traditional cars have entered daily life. However, while sharing motor vehicles is convenient for people's lives, the management of shared motor vehicles is not safe enough or convenient.

In the existing system for shared motor vehicles, the server manages the related information corresponding to each motor vehicle and the state corresponding to each motor vehicle. If an user wants to lease the motor vehicle, the user uses the mobile device, such as a mobile phone, to scan the two-dimensional code of the motor vehicle, and uploads the two-dimensional code to order a motor vehicle from the server, such as confirming the motor vehicle, verifying user identification and storing information. Then the server will unlock the motor vehicle. Subsequently, the user can unlock the motor vehicle lock and use the motor vehicle. Finally, the motor vehicle transmits an unlock message to the server, and the server will modify the bicycle lock status on the mobile phone at this time. In such a control process, since the action of the motor vehicle is mainly controlled by the user's mobile phone using a WiFi connection or a Bluetooth connection, the chance of the motor vehicle being attacked is greatly increased, and the security of the entire control system is insufficient. It will increase the operating costs and reduce driving safety. In addition, under such a control process, the development team of the shared motor vehicle system cannot update the security design of the software in real time, which also causes the security vulnerability.

In addition, in the existing shared motor vehicle system, the management of shared motor vehicles is performed by manual mainly. The leasing and returning of the motor vehicles are determined manually, or it can be carried out by automatically leasing a motor vehicle, such as directly setting a parking point for parking the motor vehicle, picking up the vehicle at the set parking point, and returning the vehicle at the set parking point. Although these methods can achieve unmanned management, the parking spaces are limited, which is not conducive to the convenience of people.

Therefore, there is a need to provide an improved solution for a shared motor vehicle, which can provide a user that can simultaneously meet the needs of user convenience and improve the safety of the control system of the entire shared motor vehicle, thereby increasing the utilization rate of the shared motor vehicle and reducing the operating costs.

SUMMARY OF THE INVENTION

The present invention relates to a control system, a control method, and a network device for a network device, and more particularly to a control system, a control method, and a network device for a network device in shared motor vehicle. It meets the needs of users for ease of use and improves the security of the entire control system, which can increase the utilization rate of shared network devices and reduce operating costs.

According to an aspect of the present invention, a control system for a network device is provided. The control system includes: a network device for connecting to the network and transmitting status information of the network device; a host server for receiving the status information and action information related to the network device via the network, where the action information includes an action command; and a Message Queuing Telemetry Transport (MQTT) server for receiving the action information from the host server and transmitting the received action information to the network device; wherein the network device executes the action command included in the action information according to the received action information.

According to another aspect of the present invention, a control method for a network device is proposed. First, the network device transmits status information to a host server by connecting to a network. Then, the host server receives the status information and action information related to the network device, wherein the action information includes an action command. Then, a Message Queuing Telemetry Transport (MQTT) server receives the action information transmitted by the host server. Then, the MQTT server transmits the action information received from the host server to the network device. Finally, the network device executes the action command included in the action information according to the received action information.

According to another aspect of the present invention, a network device is provided, which connects to a host server and a Message Queuing Telemetry Transport (MQTT) server via a network to transmit commands and messages. The network device includes: a communication platform for connecting to the network; a storage device for storing at least one sensing information obtained from at least one sensor; and a control device for generating corresponding status information based on the at least one sensing information, transmitting the corresponding status information to the host server via the communication platform, receiving the action information transmitted from the MQTT server via the communication platform, and executing the action command included in the action information.

Other various innovative functions will be described in detail in the detailed description section. Some of these functions can be understood by those skilled in the art by reading the subsequent description and the accompanying drawings, or can be learned by producing or implementing the foregoing embodiments. The various innovative functions of the present invention are successfully implemented and completed after operating or utilizing the different aspects of the methods, tools, and combinations described in the subsequent detailed embodiments.

BRIEF DESCRIPTION OF THE DRAWINGS

The control method, control system and network device described in the present invention will be further described in various embodiments. The detailed descriptions of these embodiments are based on the drawings and are non-limiting embodiments. The similar element symbols are similar structures presented between the diagrams indicating different perspectives.

FIGS. 9A to 9H are schematic diagrams of the user interfaces of the mobile device shown in FIG. 7.

DETAILED DESCRIPTION OF THE EMBODIMENTS

In order to facilitate a further understanding of the technical features of the present invention, examples are given for detailed description, but these examples are merely illustrative and do not limit the scope of the present invention.

Figure 1:
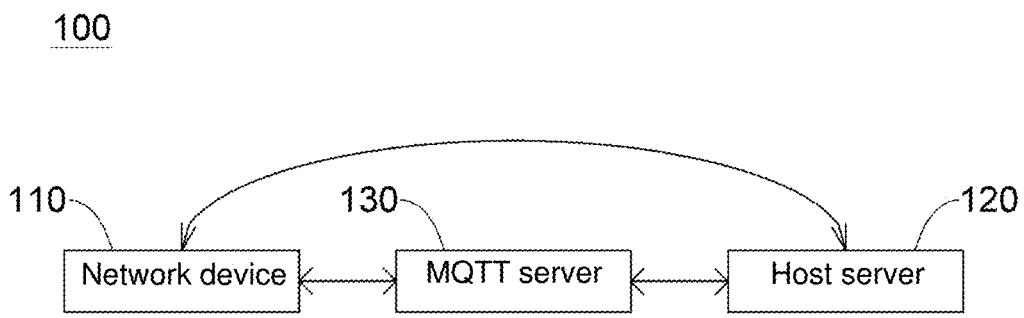
FIG. 1 is a schematic diagram of a control system for a network device according to an embodiment of the present invention.

FIG. 1 is a schematic diagram of a control system for a network device according to an embodiment of the present invention. As shown in FIG. 1, the control system 100 includes a network device 110, a host server 120, and a message queuing telemetry transport (MQTT) server 130. In this embodiment, the network device 110 of the present invention can be installed in a motor vehicle (not shown) such as an electric scooter, an electric motorcycle, or an electric car.

The network device 110 connects to a network (not shown) and transmits status information to the host server 120. The network is a single network or a combination of different networks. For example, the network is a local area network (LAN), a wide area network (WAN), a public network, a private network, a dedicated network, a public switched telephone network (PSTN), the Internet, wireless networks, virtual networks, or any combination thereof. The network may also include various network access points, such as a wired or wireless access point, such as a base station (BS) or an Internet exchange point, through which the network device 110 may connect to the network to transmit information via the network.

In this embodiment, the network device 110 may periodically or irregularly transmit the status information to the host server 120 with an encrypted communication protocol such as Hypertext Transfer Protocol Secure (HTTPS) via the network.

The host server 120 receives the status information of the network device 110 with an encrypted communication protocol such as HTTPS, and replies a message to the network device 110 with an encrypted communication protocol such as HTTPS.

The host server 120 is also used for receiving action commands related to the network device 110. In this embodiment, the action command is, for example, making the motor vehicle installed with the network device 110 to flash the lights or make the sounds for identification, leasing the motor vehicle installed with the network device 110, starting the motor vehicle installed with the network device 110, turning off the motor vehicle installed with the network device 110 or returning the motor vehicle installed with the network device 110, etc. The action command is an action command encrypted using an encryption technology such as the Advanced Encryption Standard (AES).

The host server 120 transmits the action information to the MQTT server 130 with an encrypted communication protocol such as HTTPS. The action information includes the encrypted action command and the password message related to the AES.

After the MQTT server 130 receives the action information transmitted by the host server 120, the MQTT server 130 transmits the received action information to the network device 110 using the MQTT mechanism, and the network device 110 executes the action command included in the action information based on the received action information. The action command is, for example, making the motor vehicle installed with the network device 110 to flash the lights or make the sounds for identification, leasing the motor vehicle installed with the network device 110, starting the motor vehicle installed with the network device 110, turning off the motor vehicle installed with the network device 110 or returning the motor vehicle installed with the network device 110, etc.

In this embodiment, after the network device 110 receives the action information, the network device 110 replies a message to the MQTT server 130 using the MQTT mechanism, to indicate that the action information is received. In addition, after the network device 110 executes the action command, the status information of the network device is updated to the host server 120 with an encrypted communication protocol such as HTTPS.

Figure 2:
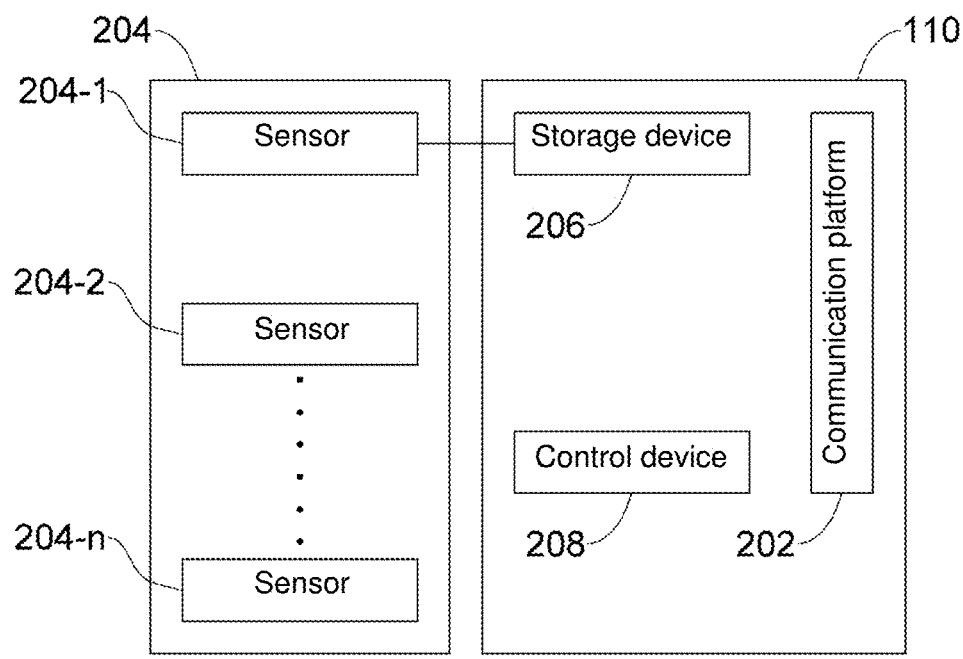
FIG. 2 is a schematic diagram of a network device according to an embodiment of the present invention.

FIG. 2 is a schematic diagram of a network device (such as the network device 110 shown in the FIG. 1) according to an embodiment of the present invention. As shown in FIG. 2, the network device 110 includes a communication platform 202, a storage device 206, and a control device 208. In order to properly describe the operation of the network device 110 in this embodiment, please also refer to FIG. 1.

The network device 110 connects to a network (not shown) using the communication platform 202 to transmit the information via the network. In this embodiment, the communication platform 202 is a 2G, 3G, 4G, or 5G wireless communication module, and the network device 110 connects to a base station (BS) via the wireless communication module, thereby connecting to the network to transmit the information via the network.

The storage device 206 is used for storing the sensing information obtained from the external sensor 204, and the external sensor 204 may include multiple sensors 204-1, 204-2, . . . , 204-n to obtain various sensing information of the network device 110. The sensing information is stored in the storage device 206. In this embodiment, the sensor 204-1 is, for example, a GPS sensor for sensing the location information of the network device 110. The sensor 204-2 is, for example, a power sensor for sensing the battery level of the network device 110. The sensor 204-n is a machine status sensor for sensing the machine status of the network device 110. For example, when the network device 110 is installed in a motor vehicle, the machine status is the driving state of the motor vehicle, or the tire temperature or the tire pressure, etc.

Figure 3:
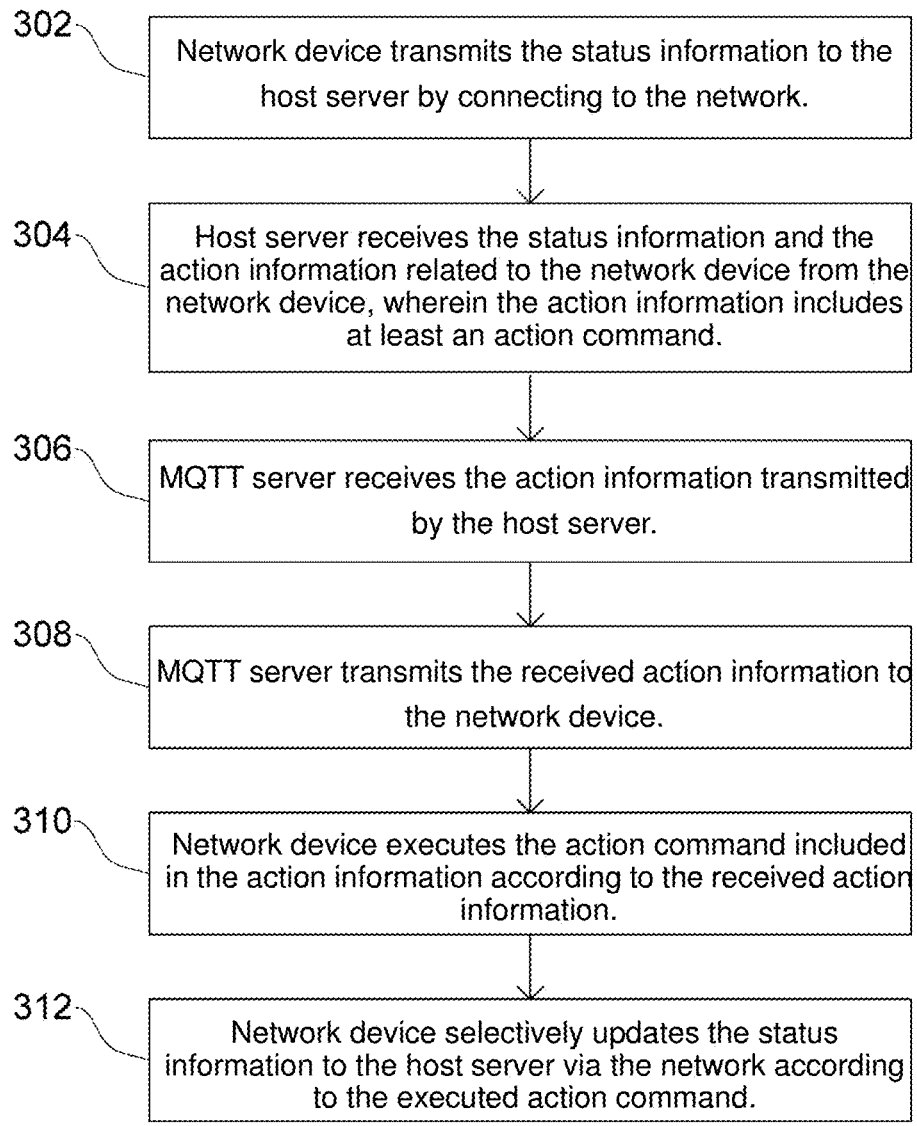
FIG. 3 is a flowchart of a control method for a network device according to an embodiment of the present invention.

In addition to storing the sensing data of the sensor 204, the storage device 206 also stores the software or programs such as the control method for the network device of the present invention shown in FIG. 3, and the host server 120 may update the software or the programs.

The control device 208 is used for receiving the sensing information transmitted by the sensor 204, and generating corresponding status information according to the sensing information transmitted by the sensor 204. The control device 208 periodically or irregularly transmits the status information to the host server 120 with an encrypted communication protocol such as HTTPS via the communication platform 202.

The network device 110 receives the action information transmitted from the MQTT server 130 using the MQTT mechanism via the communication platform 202, and transmits the received action information to the control device 208, and the control device 208 executes the action command included in the action information.

In this embodiment, after the control device 208 receives the action information, the control device 208 replies a message to the MQTT server 130 using the MQTT mechanism via the communication platform 202, to indicate that the action information is received. After the control device 208 executes the action command, the control device 208 updates the status information to the host server 120 with an encrypted communication protocol such as HTTPS via the communication platform 202. For example, after the control device 208 executes the action command of leasing the network device 110, the control device 208 updates the status information to the host server 120. In addition, when the network device 110 is in a leased state, the control device 208 shortens the period during which it automatically transmits the status information to the host server 120, that is, the period during which the control device 208 transmits the status information is shorter than the period during which it is not leased.

In this embodiment, the control device 208 may perform a security determination according to the current status information of the motor vehicle installed with the network device 110, and determine whether to execute the received action command. For example, when the motor vehicle installed with the network device 110 is in use, the action command such as turning off the motor vehicle installed with network device will not be executed. The control device 208 may also perform a security determination based on the current status information of the motor vehicle installed with the network device 110, and determine whether to perform, for example, the software or the program updates of the control method for the network device of the present invention shown in FIG. 3. For example, when the motor vehicle installed with network device 110 is in a startup state, the software or program updates are not performed.

FIG. 3 is a flowchart of a control method for a network device according to an embodiment of the present invention.

In step 302, the network device transmits the status information to the host server by connecting to the network. In this embodiment, the network device may periodically or irregularly transmit the status information to the host server with an encrypted communication protocol such as HTTPS.

In step 304, the host server receives the status information and the action information related to the network device from the network device, and the action information includes at least an action command. In this embodiment, the action command is an action command encrypted by using an encryption technology such as the AES, and the action information includes the encrypted action command and password message related to the AES.

In step 306, the MQTT server receives the action information transmitted by the host server. In this embodiment, the MQTT server receives the action information transmitted by the host server with an encrypted communication protocol such as HTTPS.

In step 308, the MQTT server transmits the received action information to the network device. In this embodiment, the MQTT server transmits the received action information to the network device using the MQTT mechanism.

In step 310, the network device executes the action command included in the action information according to the received action information. In this embodiment, the network device receives the action information using the MQTT mechanism.

In step 312, the network device selectively updates the status information to the host server via the network according to the executed action command. In this embodiment, after the network device executes the action command, the network device updates the status information to the host server with an encrypted communication protocol such as HTTPS.

Figure 4:
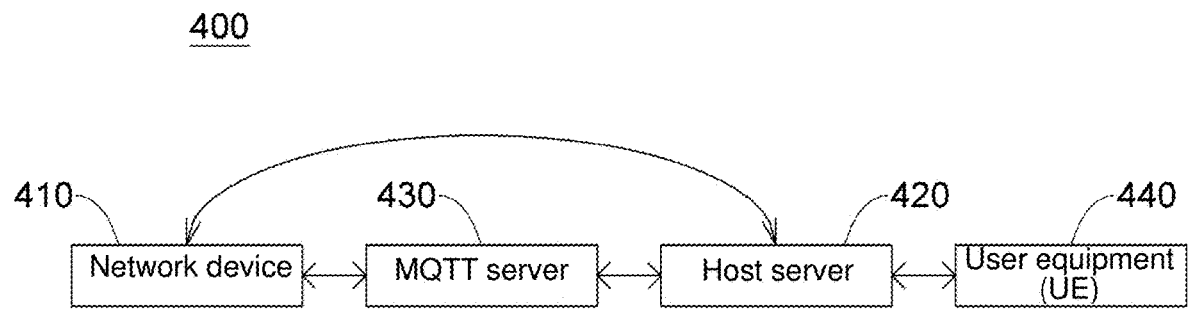
FIG. 4 is a schematic diagram of a control system for a network device according to another embodiment of the present invention.

FIG. 4 is a schematic diagram of a control system for a network device according to another embodiment of the present invention. The control system 400 controls the command and message transmissions between the network device 410, the host server 420, the MQTT server 430, and the user equipment (UE) 440. In this embodiment, the network device 410 of the present invention can be installed in a motor vehicle (not shown) such as an electric scooter, an electric motorcycle, or an electric car.

In this embodiment, the network device 410 may periodically or irregularly transmit the status information to the host server 420 with an encrypted communication protocol such as HTTPS. The host server 420 receives the status information of the network device 410 with an encrypted communication protocol such as HTTPS, and replies a message to the network device 410 with an encrypted communication protocol such as HTTPS. In addition to receiving the status information from the network device 410, the host server 420 also receives an authentication requests from the UE 440.

The UE 440 authenticates with the host server 420 via a user interface (UI) and related mobile operating system and applications (Apps) installed on it via the network. For example, the mobile operating system may be an operating system such as iOS, Android, Windows Phone, etc., and the UE 440 may be, for example a notebook computer, a built-in device in a motor vehicle, a tablet computer, or other mobile devices. In other embodiments, the UE 440 may connect to the network and the wired or the wireless technologies may be implemented in user wearable devices (such as glasses, watches, etc.), and the UE 440 may interact with the host server 420 through related mobile operating system and applications.

After the UE 440 is authenticated, the host server 420 displays the status information on the UI of the UE 440. After the UE 440 obtains the authentication, the UE 440 simultaneously receives an action request related to the network device 410 via the UI, and each action request may correspond to an action command of the motor vehicle installed with the network device 410. In this embodiment, the action command is, for example, making the motor vehicle installed with the network device 410 to flash the lights or make the sounds for identification, leasing the motor vehicle installed with the network device 410, starting the motor vehicle installed with the network device 410, turning off the motor vehicle installed with the network device 410 or returning the motor vehicle installed with the network device 410, etc. The action command is an action command encrypted by using an encryption technology such as the AES. The UE 440 transmits the action information including the action command and the password message related to the AES technology to the host server 420.

After the host server 420 receives the action information, the host server 420 transmits the action information to the MQTT server 430 with an encrypted communication protocol such as HTTPS.

After the MQTT server 430 receives the action information transmitted by the host server 420, the MQTT server 430 transmits the received action information to the network device 410 using the MQTT mechanism, and the network device 410 executes the action command included the action information according to the action information received from the MQTT server 430.

In this embodiment, after the network device 410 receives the action information, the network device 410 replies a message to the MQTT server 430 using the MQTT mechanism, to indicate that the action information is received. After the network device 410 executes the action command, the network device 410 updates the status information to the host server 420 with an encrypted communication protocol such as HTTPS.

Figure 5:
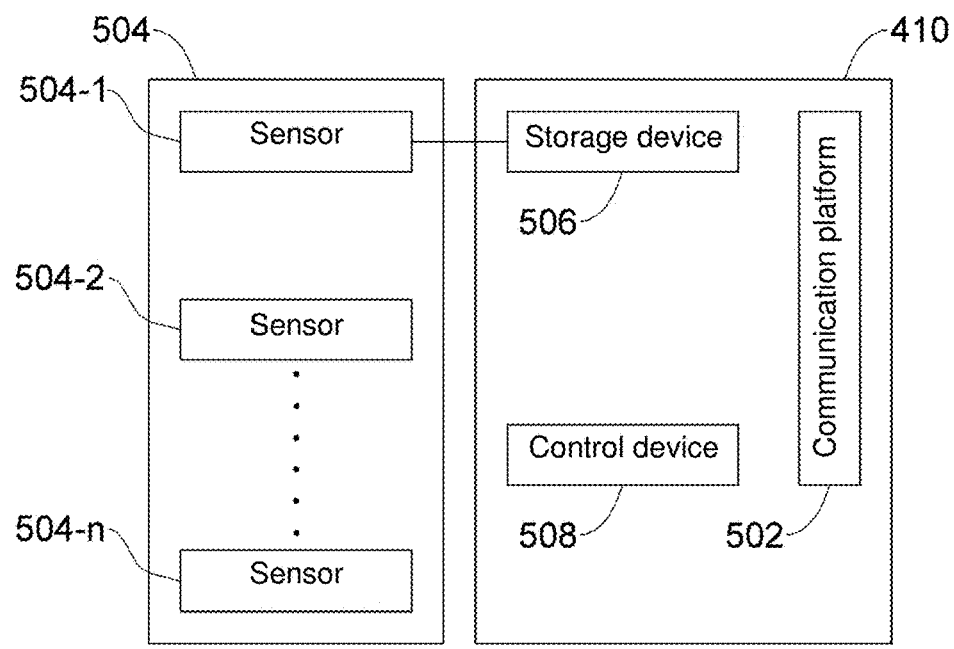
FIG. 5 is a schematic diagram of a network device according to another embodiment of the present invention.

FIG. 5 is a schematic diagram of a network device (such as the network device 410 shown in FIG. 4) according to another embodiment of the present invention. As shown in FIG. 5, the network device 410 includes a communication platform 502, a storage device 506, and a control device 508. In order to properly describe the operation of the network device 410 in this embodiment, please also refer to FIG. 4.

The network device 410 connects to the network (not shown) using a communication platform 502 to transmit information via the network. In this embodiment, the communication platform 502 is a 4G or 5G wireless communication module, and the network device 410 connects to the BS via the wireless communication module, thereby connecting to the network to transmit information via the network.

The storage device 506 is used for storing the sensing information obtained from the external sensor 504, and the external sensor 504 may include multiple sensors 504-1, 504-2, . . . , 504-n to obtain various sensing information of the network device. The sensing information is stored in the storage device 506. In this embodiment, the sensor 504-1 is, for example, a GPS sensor for sensing the location information of the network device 410. The sensor 504-2 is, for example, a power sensor for sensing the battery level of the network device 410. The sensor 504-n is a machine status sensor for sensing the machine status of the network device 410. For example, when the network device 410 is installed in a motor vehicle, the machine status is the driving state of the motor vehicle, or the tire temperature or the tire pressure, etc.

In addition to storing the sensing data of the sensor 504, the storage device 506 also stores the software or the programs such as the control method for the network device of the present invention as shown in FIG. 3, and the host server 420 may update the software or the programs.

The control device 508 is used for receiving the sensing information transmitted by the sensor 504 and generating corresponding status information according to the sensing information transmitted by the sensor 504. The control device 508 periodically or irregularly transmits the status information to the host server 420 with an encrypted communication protocol such as HTTPS via the communication platform 502.

The network device 410 receives the action information transmitted from the MQTT server 430 using the MQTT mechanism via the communication platform 502, and transmits the received action information to the control device 508, and the control device 508 executes the action command included in the action information.

In this embodiment, after the control device 508 receives the action information, the control device 508 replies a message to the MQTT server 430 using the MQTT mechanism via the communication platform 502, to indicate that the action information is received. After the control device 508 executes the action command, the control device 508 updates the status information to the host server 420 via the communication platform 502 with the encrypted communication protocol such as HTTPS. For example, after the control device 508 executes the action command of leasing the network device 410, the control device 508 updates the status information to the host server 420. In addition, when the network device 410 is in the leased state, the control device 508 shortens the period during which it automatically transmits the status information to the host server 420, that is, the period during which the control device 508 transmits the status information is shorter than the period during which it is not leased.

In this embodiment, the control device 508 may perform a security determination according to the current state information of the motor vehicle installed with the network device 410, and determine whether to execute the received action command. For example, when the motor vehicle installed with the network device 410 is in use, the action command such as turning off the motor vehicle installed with the network device will not be executed. The control device 508 may also perform a security determination based on the current state information of the motor vehicle installed with the network device 410, and determine whether to perform, for example, the software or the program updates of the control method for the network device of the present invention shown in FIG. 6. For example, when the motor vehicle installed with the network device 410 is in a startup state, the software or the program updates are not performed.

Figure 6:
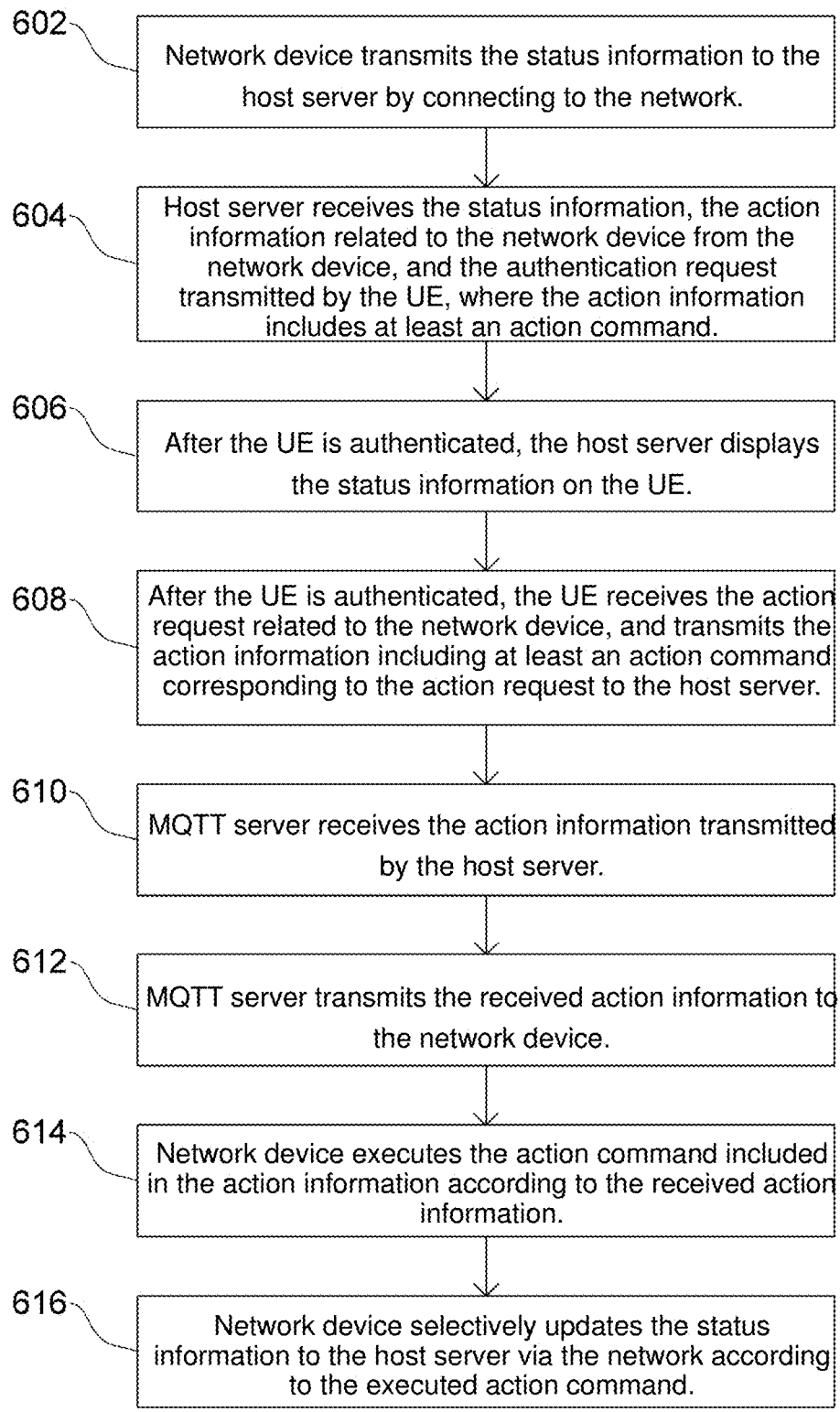
FIG. 6 is a flowchart of a control method for a network device according to another embodiment of the present invention.

FIG. 6 is a flowchart of a control method for a network device according to another embodiment of the present invention. In step 602, the network device transmits the status information to the host server by connecting to the network. In this embodiment, the network device may periodically or irregularly transmit the status information to the host server with an encrypted communication protocol such as HTTPS.

In step 604, the host server receives the status information and the action information related to the network device from the network device, and receives the authentication request transmitted by the UE, where the action information includes at least an action command. In this embodiment, the UE uses a user name and a password to log in to a third-party authentication platform to obtain an Oauth2.0 token (ID token), and uses the ID token to perform identity authentication with the host server. After the authentication is successful, the host server generates another Token (App token), and then transmits the App token to the UE. After the UE receives the App token, the UE stores the App token, for example, the APP token is stored in the storage device of the UE. After that, when the UE transmits a request to the host server, the UE brings the App token every time. In this embodiment, the UE performs the authentication with the host server via a user interface (UI) and related mobile operating systems and applications (App) installed on the UE via the network.

In step 606, after the UE is authenticated, the host server displays the status information on the UE. In this embodiment, after the UE obtains the authentication, the host server displays the status information on the UI of the UE.

In step 608, after the UE is authenticated, the UE receives the action request related to the network device, and transmits the action information including at least an action command corresponding to the action request to the host server. In this embodiment, after the UE obtains the authentication, the UE simultaneously receives an action request related to the network device via the UI, and each action request may correspond to an action command of the motor vehicle installed with the network device. The action command is, for example, making the motor vehicle installed with the network device to flash the lights or make the sounds for identification, leasing the motor vehicle installed with the network device, starting the motor vehicle installed with the network device, turning off the motor vehicle installed with the network device or returning the motor vehicle installed with the network device, etc. The UE transmits the action information including the action command and token to the host server. After the host server receives the request, the host server verifies the token in the UE request. If the verification is successful, the host server transmits the action information of the UE to MQTT server.

In step 610, the MQTT server receives the action information transmitted by the host server. In this embodiment, the MQTT server receives the action information transmitted by the host server with an encrypted communication protocol such as HTTPS.

In step 612, the MQTT server transmits the received action information to the network device. In this embodiment, the MQTT server transmits the received action information to the network device using the MQTT mechanism.

In step 614, the network device executes the action command included in the action information according to the received action information. In this embodiment, the network device receives the action information using the MQTT mechanism.

In step 616, the network device selectively updates the status information to the host server via the network according to the executed action command. In this embodiment, after the network device executes the action command, the network device updates the status information to the host server with an encrypted communication protocol such as HTTPS.

Figure 7:
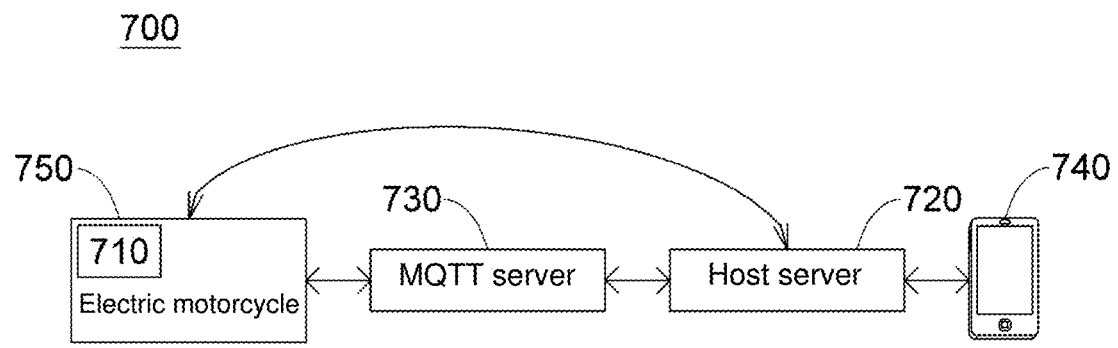
FIG. 7 illustrates an application of a control system for a network device of the present invention to the motor vehicle sharing.

FIG. 7 illustrates an application of a control system for a network device of the present invention to the motor vehicle sharing. As shown in FIG. 7, the control system 700 of the present invention controls the command and the message transmissions between the network device 710, the host server 720, the MQTT server 730, and the mobile device 740 installed in the electric motorcycle 750. In this embodiment, the network device 710 of the present invention is installed in an electric motorcycle 750 is described as an embodiment, and the mobile device 740 is used as the aforementioned user equipment (UE) as an embodiment. However, it should be noted that the installation of the network device 710 of the present invention in a motor vehicle may be embodied as another example, for example, the network device 710 of the present invention can be installed in an electric motor vehicle such as an electric bicycle, an electric car, or the like. The UE can also be used as other examples, such as laptops, built-in devices in motor vehicles, tablet computers and other terminal devices.

In this embodiment, the network device 710 installed in the electric motorcycle 750 may periodically or irregularly transmit the status information to the host server 720 with an encrypted communication protocol such as HTTPS. The host server 720 receives the status information of the network device 710 installed on the electric motorcycle 750 with an encrypted communication protocol such as HTTPS, and replies a message to the network device 710 installed in the electric motorcycle 750 with an encrypted communication protocol such as HTTPS. In addition to receiving the status information from the network device 710 installed in the electric motorcycle 750, the host server 720 also receives the authentication request from the mobile device 740.

The mobile device 740 is authenticated with the host server 720 via an user interface (UI) and related mobile operating systems installed on it. The mobile operating system may be, for example iOS, Android, or Windows Phone, etc. In this embodiment, the mobile device 740 uses google oauth 2.0 or facebook oauth 2.0 to perform identity verification with the host server 720. In addition, it should be emphasized that there are various types of authentication methods for the mobile device 740 in the present invention, For example, the law of the country where the user of the mobile device 740 is located requires that the rental of the electric motorcycle 710 requires a driver's license. The authentication of the mobile device 740 includes the verification of the driver's license of the user of the mobile device 740.

After the mobile device 740 is authenticated, the host server 720 displays the status information on the UI of the mobile device 740. After the mobile device 740 obtains the authentication, the mobile device 740 simultaneously receives the action request related to the network device 710 installed in the electric motorcycle 750 via the UI, and each action request may correspond to an action command of the electric vehicle 750 installed with the network device 710. In this embodiment, the action command is, for example, making the electric motorcycle 750 to flash the lights or make the sounds for identification, leasing the electric motorcycle 750, starting the electric motorcycle 750, turning off the electric motorcycle 750 or returning the electric motorcycle 750, etc. The action command is an action command encrypted by using an encryption technology such as the AES. The mobile device 740 transmits the action information including the action command and the password message related to the AES technology to the host server 720.

After the host server 720 receives the action information, the host server 720 transmits the action information to the MQTT server 730 with an encrypted communication protocol such as HTTPS.

After the MQTT server 730 receives the action information transmitted by the host server 720, the MQTT server 730 transmits the received action information to the network device 710 installed in the electric motorcycle 750 using the MQTT mechanism. The network device 710 installed in the electric motorcycle 750 executes the action command included in the action information according to the action information received from the MQTT server 730.

In this embodiment, after the network device installed in the electric motorcycle 750 receives the action information, the network device replies a message to the MQTT server 730 using the MQTT mechanism, to indicate that the action information is received. The network device 710 installed in the electric motorcycle 750 executes the action command, and updates the status information to the host server 720 with an encrypted communication protocol such as HTTPS.

Figure 8:
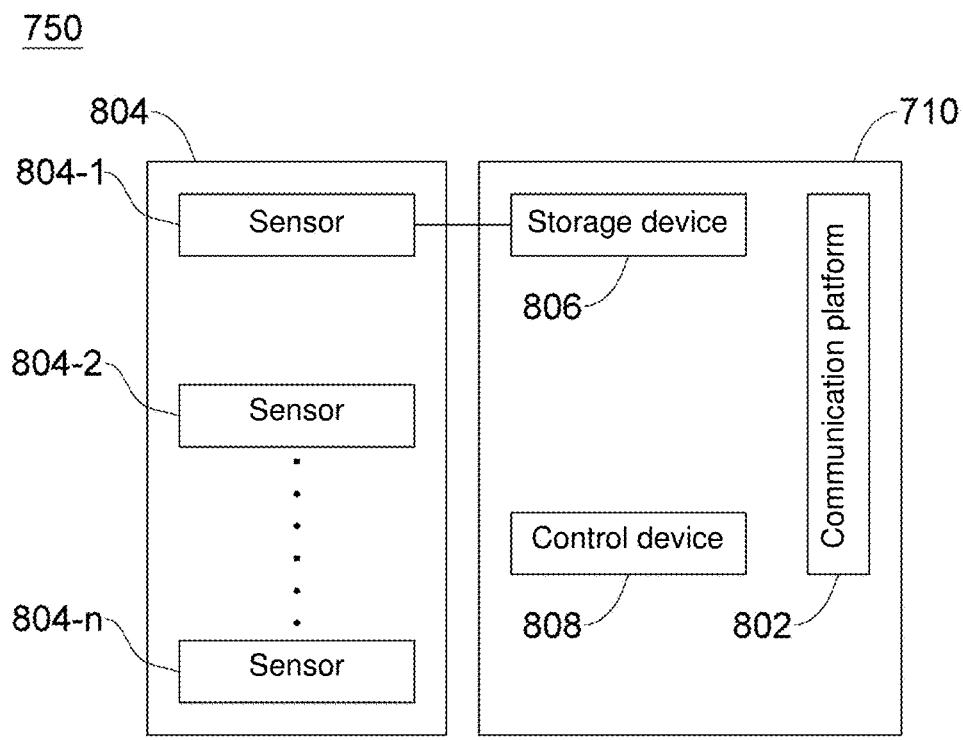
FIG. 8 illustrates an application of a network device of the present invention to the motor vehicle sharing.

FIG. 8 illustrates an application of a network device of the present invention to the motor vehicle sharing (for example, the network device 710 shown in FIG. 7 is installed in the electric motorcycle 750). As shown in FIG. 8, the electric motorcycle 750 is installed with at least a network device 710 and a sensor 804. The network device 710 includes a communication platform 802, a storage device 806, and a control device 808. In order to properly describe the operation of the network device 710 installed in the electric motorcycle 750 in this embodiment, please also refer to FIG. 7.

The network device 710 installed in the electric motorcycle 750 connects to the network (not shown) using the communication platform 802 to transmit the information via the network. In this embodiment, the communication platform 802 is a 2G, 3G, 4G or 5G wireless communication module, the network device 710 installed in the electric motorcycle 750 connects to the BS via the wireless communication module, thereby connecting to the network to transmit the information via the network.

The storage device 806 is used for storing the sensing information obtained from the sensor 804. The external sensor 804 may include multiple sensors 804-1, 804-2, . . . , 804-$n$ to obtain the various sensing information of the electric motorcycle 750. The sensing information is stored in the storage device 806. In this embodiment, the sensor 804-1 is, for example, a GPS sensor for sensing the location information of the electric motorcycle 750. The sensor 804-2 is, for example, a power sensor for sensing the battery level of the electric motorcycle 750. The sensor 804-$n$ is a machine status sensor for sensing the machine status of the electric motorcycle 750. For example, the machine status is the driving state of the electric motorcycle, or the tire temperature or the tire pressure, etc.

Figure 10:
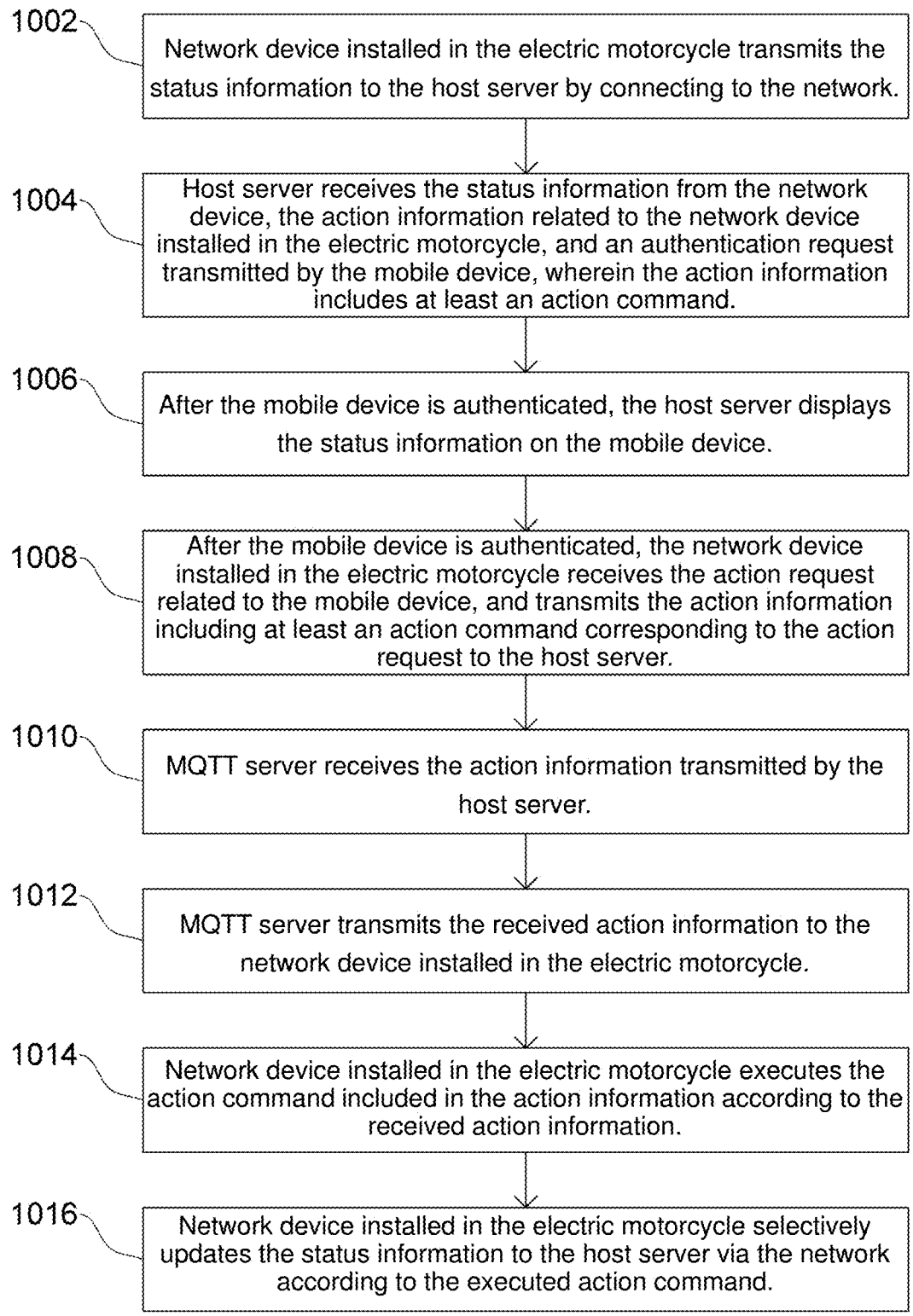
FIG. 10 illustrates a flowchart of an application of a control method for a network device of the present invention to a motor vehicle sharing.

In addition to storing the sensing data of the sensor 804, the storage device 806 also stores the software or the programs such as the control method for a network device of the present invention as shown in FIG. 10. The host server 720 may update the software or the programs.

The control device 808 is used for receiving the sensing information transmitted by the sensor 804 and generating corresponding status information according to the sensing information transmitted by the sensor 804. The control device 808 periodically or irregularly transmits the status information to the host server 720 via the communication platform 802 with an encrypted communication protocol such as HTTPS.

The network device 710 installed in the electric motorcycle 750 receives the action information transmitted from the MQTT server 730 using the MQTT mechanism via the communication platform 802, and transmits the received action information to the control device 808, and the control device 808 executes the action command included in the action information.

In this embodiment, after the control device 808 receives the action information, the control device 808 replies a message to the MQTT server 730 using the MQTT mechanism via the communication platform 802, to indicate that the action information is received. After the control device 808 executes the action command, the control device 808 updates the status information to the host server 720 with an encrypted communication protocol such as HTTPS via the communication platform 802. For example, after the control device 808 executes the action command of leasing the electric motorcycle 750, the control device 808 updates the status information to the host server 720. In addition, when the electric motorcycle 750 is in a leased state, the control device 808 shortens the period during which it automatically transmits the status information to the host server 720, that is, the period during which the control device 808 transmits the status information is shorter than the period during which it is not leased.

In this embodiment, the control device 808 performs a security determination based on the current state information of the network device 710 installed in the electric motorcycle 750, and determines whether to execute the received action command. For example, when the network device 710 installed in the electric motorcycle 750 is in use, the action command such as turning off the network device will not be executed. The control device 808 also performs a security determination based on the current state information of the network device 710 installed in the electric motorcycle 750, and determines whether to perform, for example the software or the program updates of the control method for the network device of the present invention shown in FIG. 10. For example, when the electric motorcycle 750 is in a startup state, the software or the program updates are not performed.

Figure 9C:
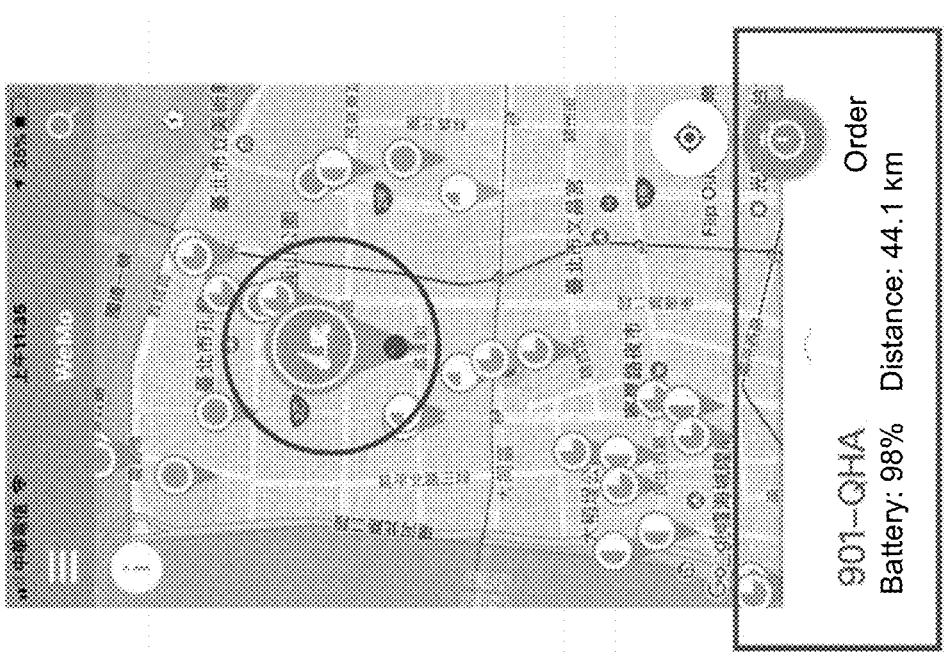
Figure 9B:
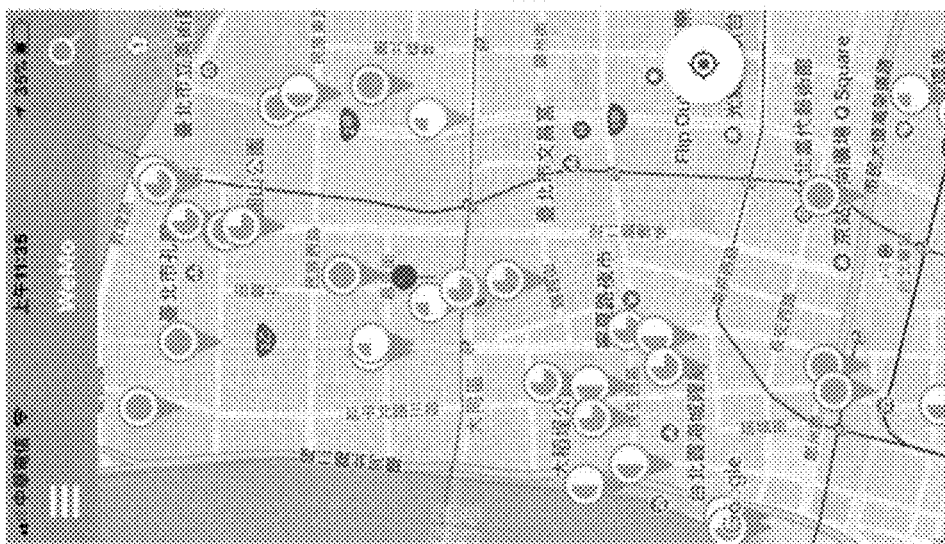
Figure 9A:
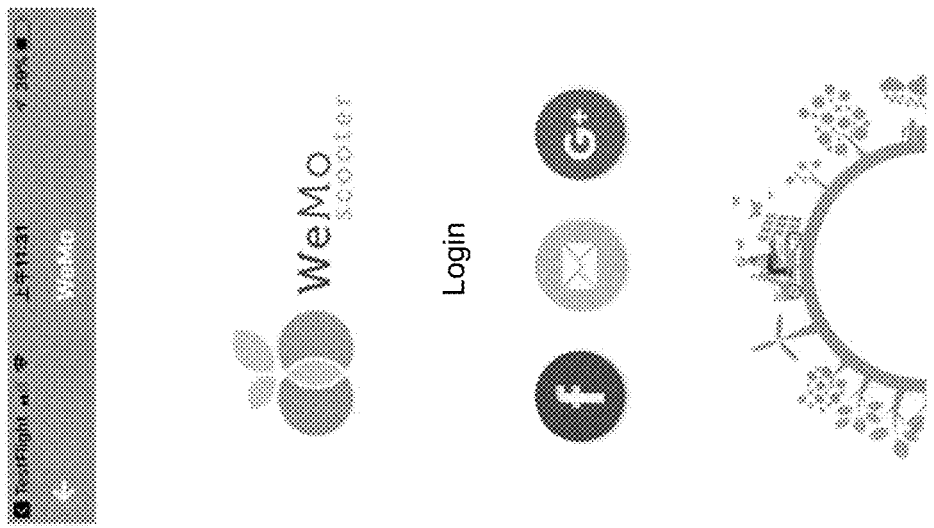
Figure 9E:
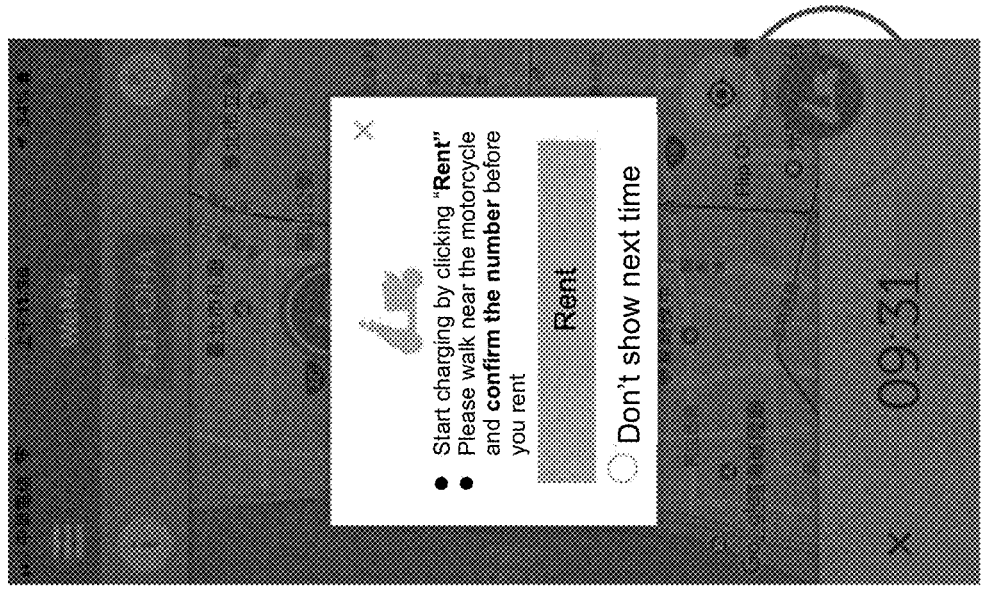
Figure 9D:
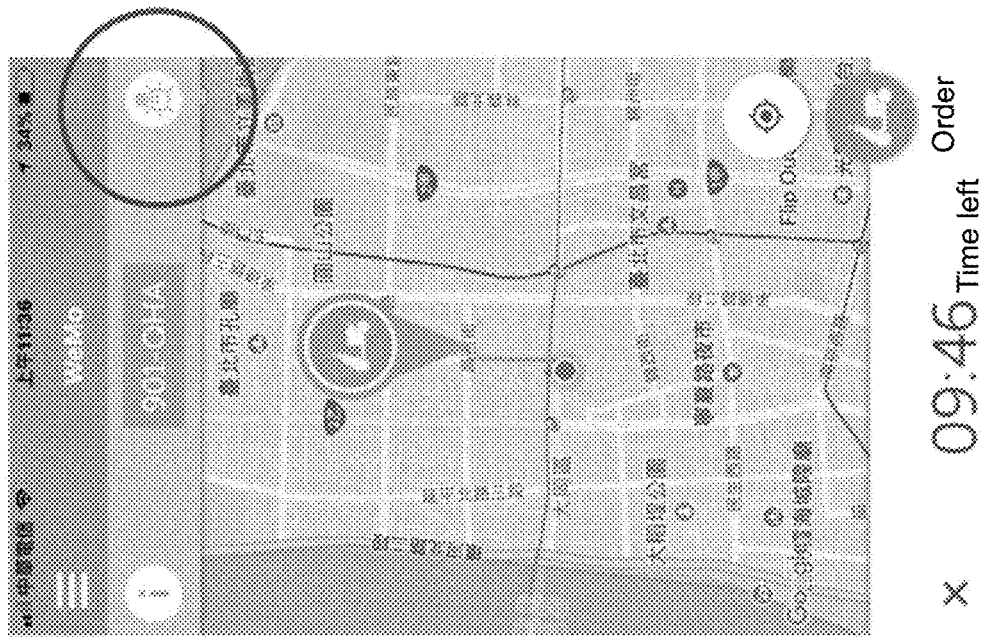

FIGS. 9A to 9H are schematic diagrams of the user interface (UI) of the mobile device shown in FIG. 7. As shown in FIG. 9A, the mobile device 740 performs authentication with the host server 720 through the UI via the network. As shown in FIG. 9B, after the mobile device 740 is authenticated by the host server 720, the UI of the mobile device 740 displays the related information of the location of multiple electric motorcycles and the related information of the battery level. The authenticated mobile device 740 receives the clicks on the electric motorcycle via the UI. As shown in FIG. 9C, the battery level and the rideable distance of the selected electric motorcycle are shown. The authenticated mobile device 740 may also receive the action requests related to the electric motorcycle via the UI. Each action request may correspond to an action command of the electric motorcycle. When the action command is making the electric motorcycle to flash the lights, the UI will be as shown in FIG. 9D. When the action command is leasing the electric motorcycle, the UI will be as shown in FIG. 9E. When the action command is starting the electric motorcycle, the UI will be as shown in FIG. 9F. When the action command is turning off the electric motorcycle, the UI will be as shown in FIG. 9G. When the action command is returning the electric motorcycle, the UI will be as shown in FIG. 9H.

FIG. 10 illustrates a flowchart of an application of a control method for a network device of the present invention in a motor vehicle sharing. In step 1002, the network device installed in the electric motorcycle transmits the status information to the host server by connecting to the network. In this embodiment, the network device may periodically or irregularly transmit its status information to the host server with an encrypted communication protocol such as HTTPS.

In step 1004, the host server receives the status information from the network device, the action information related to the network device installed in the electric motorcycle, and an authentication request transmitted by the mobile device, wherein the action information includes at least an action command. In this embodiment, the action command is an action command encrypted by using an encryption technology such as the AES, and the action information includes the encrypted action command and the password information related to the AES. In this embodiment, the mobile device performs authentication with the host server via a user interface (UI) and related mobile operating systems and applications (Apps) installed on the mobile device via a network.

In step 1006, after the mobile device is authenticated, the host server displays the status information on the mobile device. In this embodiment, after the mobile device obtains the authentication, the host server displays the status information on the UI of the mobile device.

In step 1008, after the mobile device is authenticated, the network device installed in the electric motorcycle receives the action request related to the mobile device, and transmits the action information including at least an action command corresponding to the action request to the host server. In this embodiment, after the mobile device obtains authentication, the mobile device simultaneously receives the action requests related to the network device installed in the electric motorcycle via the UI, and each of the action request may correspond to an action command of the electric motorcycle installed with the network device. In this embodiment, the action command is, for example, making the electric motorcycle to flash the lights or make the sounds for identification, leasing the electric motorcycle, starting the electric motorcycle, turning off the electric motorcycle, or returning the electric motorcycle. The action command is an action command encrypted by using an encryption technology such as the AES. The UE transmits the action information including the action command and the password message related to the AES technology to the host server.

In step 1010, the MQTT server receives the action information transmitted by the host server. In this embodiment, the MQTT server receives the action information transmitted by the host server with an encrypted communication protocol such as HTTPS.

In step 1012, the MQTT server transmits the received action information to the network device installed in the electric motorcycle. In this embodiment, the MQTT server transmits the received action information to the network device using the MQTT mechanism.

In step 1014, the network device installed in the electric motorcycle executes the action command included in the action information according to the received action information. In this embodiment, the network device receives the action information using the MQTT mechanism.

In step 1016, the network device installed in the electric motorcycle selectively updates the status information to the host server via the network according to the executed action command. In this embodiment, after the network device executes the action command, the network device updates the status information to the host server with an encrypted communication protocol such as HTTPS.

Those skilled in the art will recognize that the present invention has adjustment flexibility and can be modified and/or strengthened. For example, although the above-mentioned manner of setting various components is implemented in a hardware device, it can also be limited to be implemented in software only, such as installing on an existing server. In addition, the control method for the network device disclosed in the present invention may be implemented by using firmware, a combination of firmware or software, a combination of firmware or hardware, or a combination of hardware or firmware or software.

The foregoing description has described the constituent elements of the teachings and/or other embodiments of the present invention, but from the above, various modifications can be applied thereto, and the subject matter disclosed by the present invention can be implemented through various forms and embodiments. The teaching of the present invention can be applied to a variety of applications, but the present invention describes only a few of them. The purpose of the following patent application is to claim any and all applications, modifications, and variations that do not exceed the exact scope of the teachings of the present invention.

What is claimed is:

1. A control system for a network device, the control system comprising:
   a network device for connecting to a network and transmitting a status information of the network device;
   a host server for receiving the status information and an action information related to the network device via the network, wherein the action information includes an action command; and
   a Message Queuing Telemetry Transport (MQTT) server for receiving the action information from the host server and transmitting the received action information to the network device;
   wherein the network device performs a security determination according to the action information and the status information to determine whether to execute the action command included in the action information,
   wherein when the network device determines that it is allowable to execute the action command included in the action information, the network device executes the action command included in the action information according to the action information; and
   wherein the security determination indicates that when a motor vehicle installed with the network device is in use, the action command will not be executed.

2. The control system according to claim 1, wherein after the network device executes the action command, the network device updates the status information to the host server via the network.

3. The control system according to claim 1, wherein the host server receives the action information from a user equipment that has obtained authentication from the server, and transmits the action information to the MQTT server, and the action information includes the encrypted action command and a related password message.

4. The control system according to claim 1, wherein the network device includes a communication platform for connecting to the network, and the control system further comprising:
   at least one sensor for obtaining at least one sensing information; and
   a processor for generating a corresponding status information according to the at least one sensing information, and transmitting the corresponding status information to the host server with an encrypted communication protocol via the communication platform.

5. The control system according to claim 1, wherein the action information includes an encrypted action command and a related password message.

6. A control method for a network device, the control method comprising:
   (a) a network device transmitting a status information to a host server by connecting to a network;
   (b) the host server receiving the status information and an action information related to the network device, wherein the action information includes an action command;

(c) a Message Queuing Telemetry Transport (MQTT) server receiving the action information transmitted by the host server;

(d) the MQTT server transmitting the action information received from the host server to the network device; and (e) the network device performing a security determination according to the received action information and the status information to determine whether to execute the action command included in the action information, wherein when the network device determines that it is allowable to execute the action command included in the action information, the network device executing the action command included in the action information according to the received action information, wherein the security determination indicates that when a motor vehicle installed with the network device is in use, the action command will not be executed.

7. The control method according to claim 6, further comprising:
(f) the network device updating the status information to the host server via the network according to the executed action command.

8. The control method according to claim 6, wherein the step (b) comprising:
the host server receiving an authentication request from an user equipment;
the host server displaying the status information on the user equipment; and
the user equipment receiving an action request related to the action command and transmitting the action information including the action command to the host server.

9. The control method according to claim 6, wherein the step (a) comprising:
obtaining at least one sensing information of at least one sensor;
generating corresponding status information according to the at least one sensing information; and
the network device connecting to the network via a communication platform, and transmitting the status information to the host server with an encrypted communication protocol.

10. The control method according to claim 6, wherein the action information includes an encrypted action command and a related password message.

11. A network device connecting to a host server and a Message Queuing Telemetry Transport (MQTT) server via a network for command and message transmissions, the network device comprising:
a communication platform for connecting to the network;
a storage device for storing at least one sensing information obtained from at least one sensor; and
a control device for generating a corresponding status information according to the at least one sensing information, transmitting the corresponding status information to the host server via the communication platform, receiving an action information transmitted from the MQTT server via the communication platform, performing a security determination according to the action information and the status information to determine whether to execute the action command included in the action information, and executing an action command included in the action information when the control device determines that it is allowable to execute the action command included in the action information,
wherein the security determination indicates that when a motor vehicle installed with the network device is in use, the action command will not be executed.

12. The network device according to claim 11, wherein after executing the action command, the control device transmits an updated status information to the host server via the communication platform.

13. The network device according to claim 11, wherein the status information is displayed on an user equipment authenticated by the host server, the user equipment receives an action request related to the action command, and transmits the action information to the MQTT server via the host server.

14. The network device according to claim 11, wherein the communication platform transmits the status information to the host server with an encrypted communication protocol.

15. The network device according to claim 11, wherein the action information further includes an encrypted action command and a related password message.

16. The network device according to claim 11, wherein the network device and the at least one sensor are installed in a motor vehicle, and the action command is executed for identifying the motor vehicle, leasing the motor vehicle, starting the motor vehicle, turning off the motor vehicle, or returning the motor vehicle.

* * * * *